United States Patent [19]

Dobie et al.

[11] Patent Number: 5,717,192
[45] Date of Patent: Feb. 10, 1998

[54] JET IMPINGEMENT BATCH OVEN

[75] Inventors: Michael J. Dobie, Double Oak; Carl J. Dougherty, Grand Prairie; John R. Norris, Plano, all of Tex.

[73] Assignee: Patentsmith Technology, Ltd., Dallas, Tex.

[21] Appl. No.: 474,531

[22] Filed: Jun. 7, 1995

Related U.S. Application Data

[60] Continuation-in-part of Ser. No. 410,486, Mar. 24, 1995, Pat. No. 5,539,187, which is a division of Ser. No. 958,968, Oct. 9, 1992, Pat. No. 5,401,940, which is a continuation-in-part of Ser. No. 723,250, Jun. 28, 1991, Pat. No. 5,210,387, which is a continuation-in-part of Ser. No. 463,279, Jan. 10, 1990, Pat. No. 5,147,994.

[51] Int. Cl.$^6$ .................... H05B 6/64; A23L 3/00; F27B 9/04
[52] U.S. Cl. .................... 219/681; 219/679; 219/400; 99/443 C; 99/475; 221/150 R; 126/21 A
[58] Field of Search .................... 219/400, 679, 219/681; 99/355, 357, 427, 473, 475; 221/150 A, 150 R, 150 HC; 426/466, 241, 243; 126/21 A

[56] References Cited

U.S. PATENT DOCUMENTS

| | | | |
|---|---|---|---|
| 3,283,113 | 11/1966 | Smith | 219/10.55 R |
| 3,333,666 | 8/1967 | Murray et al. | 99/355 |
| 3,343,479 | 9/1967 | Wassberg | 219/400 |
| 3,381,605 | 5/1968 | Smith | 219/10.55 R |
| 3,386,550 | 6/1968 | Murray et al. | 99/355 |
| 3,397,817 | 8/1968 | Smith | 219/10.55 A |
| 3,404,620 | 10/1968 | Smith | 219/10.55 R |
| 3,442,200 | 5/1969 | Babel | 99/357 |
| 3,534,676 | 10/1970 | Rubino | 99/355 |
| 3,884,213 | 5/1975 | Smith | 219/400 |
| 4,004,712 | 1/1977 | Pond | 219/10.55 B |
| 4,144,438 | 3/1979 | Gelman et al. | 219/10.55 E |
| 4,154,861 | 5/1979 | Smith | 426/466 |
| 4,190,757 | 2/1980 | Turpin et al. | 217/10.55 E |
| 4,289,792 | 9/1981 | Smith | 426/241 |
| 4,337,116 | 6/1982 | Foster et al. | 219/10.55 E |
| 4,338,911 | 7/1982 | Smith | 126/21 A |
| 4,374,318 | 2/1983 | Gillium | 219/400 |
| 4,398,651 | 8/1983 | Kumpfer | 219/10.55 R |
| 4,409,453 | 10/1983 | Smith | 219/10.55 A |
| 4,592,485 | 6/1986 | Anderson et al. | 219/10.55 R |
| 4,626,641 | 12/1986 | Brown | 219/10.55 E |
| 4,745,249 | 5/1988 | Daniels | 219/10.55 E |
| 4,750,276 | 6/1988 | Smith et al. | 34/149 |
| 4,762,250 | 8/1988 | Fiberg | 221/123 |
| 4,783,582 | 11/1988 | Wada et al. | 219/10.55 R |
| 4,784,292 | 11/1988 | Jondrow et al. | 99/357 |
| 4,835,351 | 5/1989 | Smith et al. | 219/10.55 R |
| 4,925,684 | 5/1990 | Simon | 426/107 |
| 4,940,869 | 7/1990 | Scholtes et al. | 219/10.55 F |
| 5,011,042 | 4/1991 | Bunce et al. | 221/150 A |
| 5,131,841 | 7/1992 | Smith et al. | 432/59 |
| 5,147,994 | 9/1992 | Smith et al. | 219/10.55 R |
| 5,205,274 | 4/1993 | Smith et al. | 126/21 A |
| 5,210,387 | 5/1993 | Smith et al. | 219/10.55 M |
| 5,310,978 | 5/1994 | Smith et al. | 219/681 |
| 5,398,666 | 3/1995 | Smith et al. | 126/21 A |
| 5,401,940 | 3/1995 | Smith et al. | 219/679 |
| 5,423,248 | 6/1995 | Smith et al. | 99/443 C |
| 5,510,601 | 4/1996 | Smith et al. | 219/679 |

*Primary Examiner*—Tu B. Hoang
*Attorney, Agent, or Firm*—Sidley & Austin

[57] ABSTRACT

Apparatus to transfer heat to the surface of a product includes a product support, a duct having a duct entrance, a duct outlet and a longitudinal duct axis and a plenum for delivering temperature controlled fluid into the entrance of the duct such that fluid flows longitudinally of the duct toward the outlet. A perforated plate has at least one orifice, having an orifice axis extending generally toward a product support for forming a jet of fluid, having a jet axis, flowing in a predetermined direction. The longitudinal duct axis of the duct is rotated relative to the orifice axis for changing the direction of the jet axis relative to the orifice axis for moving the jet axis relative to the product support.

15 Claims, 9 Drawing Sheets

5,717,192

JET IMPINGEMENT BATCH OVEN

CROSS REFERENCE TO RELATED APPLICATIONS

This application is a Continuation-in-Part of application Ser. No. 08/410,486 filed Mar. 24, 1995, now U.S. Pat. No. 5,539,184, which is a Divisional of application Ser. No. 07/958,968, filed Oct. 9, 1992, now Pat. No. 5,401,940, which was a Continuation-in-Part of application Ser. No. 07/723,250, filed Jun. 28, 1991, now U.S. Pat. No. 5,210,387, which was a Continuation-in-Part of application Ser. No. 07/463,279, filed Jan. 10, 1990, now U.S. Pat. No. 5,147,994.

TECHNICAL FIELD

The invention disclosed herein relates to a combination microwave and jet impingement oven.

BACKGROUND OF INVENTION

Microwave ovens of the type disclosed in U.S. Pat. No. 5,310,978 entitled "METHOD AND APPARATUS FOR CONTROLLING THE TEMPERATURE AND SURFACE TEXTURE OF A FOOD PRODUCT" and jet impingement ovens of the type disclosed in U.S. Pat. No. 5,205,274 entitled "TURNTABLE CONVECTION OVEN" and U.S. Pat. No. 5,131,841 entitled "BALANCED AIR RETURN CONVECTION OVEN" generally operate on the principle that a food product is moved on a conveyor or turntable relative to stationary jets, in the case of the two latter mentioned patents, or an air duct is moved relative to the food product in the first mentioned patent for causing discrete jets of air to sweep across the surface of a food product. Impingement ovens are widely used in commercial food service and food processing applications because the heat transfer rate between the circulating air and food products is significantly greater than that achieved by convection ovens in which diffused air is circulated through a cooking compartment.

The use of jet impingement heating in combination with microwave heating, as generally disclosed in U.S. Pat. No. 5,147,994, offers very rapid heating because microwave energy is used for thawing or heating the food product while intense jets rapidly transfer heat to the surface of the food product. Food products cooked in the combination microwave and jet impingement oven has improved surface texture and is more palatable than food products cooked in a conventional microwave oven.

Difficulty has been encountered heretofore in developing a small oven suitable for home use which incorporates the advantageous features of the combination microwave and jet impingement heating in a unit which is suitable for installation in residential kitchens. Impingement ovens require a relatively high volume of air flow. Large motors and fans generate more noise and consume more electrical power than is desirable in a residential kitchen.

An oven suitable for "built-in" application in residential kitchens is preferably about the same size as conventional "built-in" ovens and installed in a cabinet accessible through an opening formed in a wall. Impingement oven designs heretofore devised have been larger than conventional ovens because of the mechanisms for imparting relative movement between the food product and the impingement jets and the large impingement air circulating systems.

SUMMARY OF INVENTION

The oven disclosed herein incorporates a stirring mechanism having an air duct formed therein that stirs microwave while forming jets of air that move as the stir mechanism rotates. In the disclosed embodiment, the stirring mechanism includes an elongated duct having an open side formed in a central portion of a disc having openings formed outside the duct for permitting transmission of microwave energy through the disc. As the stir mechanism rotates, the direction of air flowing through the duct toward openings in a jet plate is constantly changed causing jets of air flowing through the opening to oscillate about an axis of the opening.

The intensity of heat to the bottom surface of a food product in a pan is adjustable by changing the elevation of a rack supporting the pan above a bottom jet plate.

Two motors are provided to independently control blowers which deliver air to top and bottom jet forming devices. The use of two motors and two blowers, drawing air from a common return plenum, permits independent adjustment of the volume of air delivered through upper and lower jet forming devices. The use of two small motors rather than a single large motor improves space utilization to help fit the oven into a standard oven area. A plurality of small fans can deliver a substantial volume of air while running at low noise levels.

DESCRIPTION OF DRAWINGS

Drawings of a preferred embodiment of the invention are annexed hereto so that the invention may be better and more fully understood, in which.

Numeral references are employed to designate like parts throughout the various figures of the drawing.

Numeral references designate like parts throughout the various figures of the drawings.

DESCRIPTION OF A PREFERRED EMBODIMENT

Figure 1:
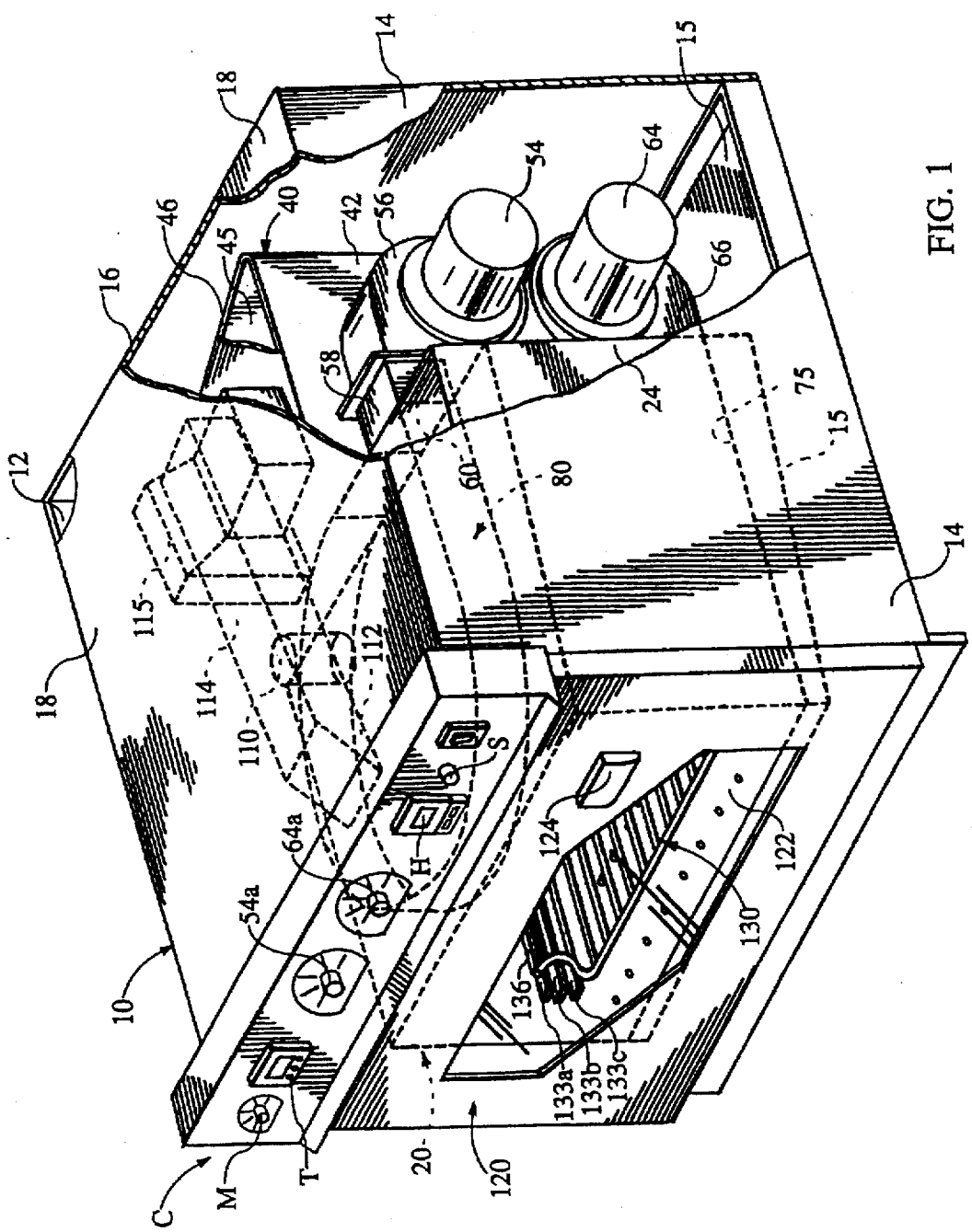
FIG. 1 is a perspective view of a jet impingement batch oven, parts being broken away to more clearly illustrate details of the construction.

Referring to FIG. 1 of the drawing, the numeral 10 generally designates an outer case 10 in which the oven is mounted. Case 10 includes spaced side walls 12 and 14, a bottom wall 15, a rear wall 16, and a top wall 18. The precise configuration of case 10 may vary depending upon the type of oven installation. If the oven is to be "built-in" front edges of side walls 12, 14, bottom 15 and top 18 will preferably be provided with flanges to facilitate mounting the case in an opening in a wall or cabinetry.

An oven cabinet 20 has spaced side walls 22 and 24, a bottom wall 25, a rear wall 26 and a top wall 28 enclosing a cooking compartment 30. As best illustrated in FIG. 3 bottom wall 25 is inclined upwardly toward the front of oven cabinet 20.

Figure 2:
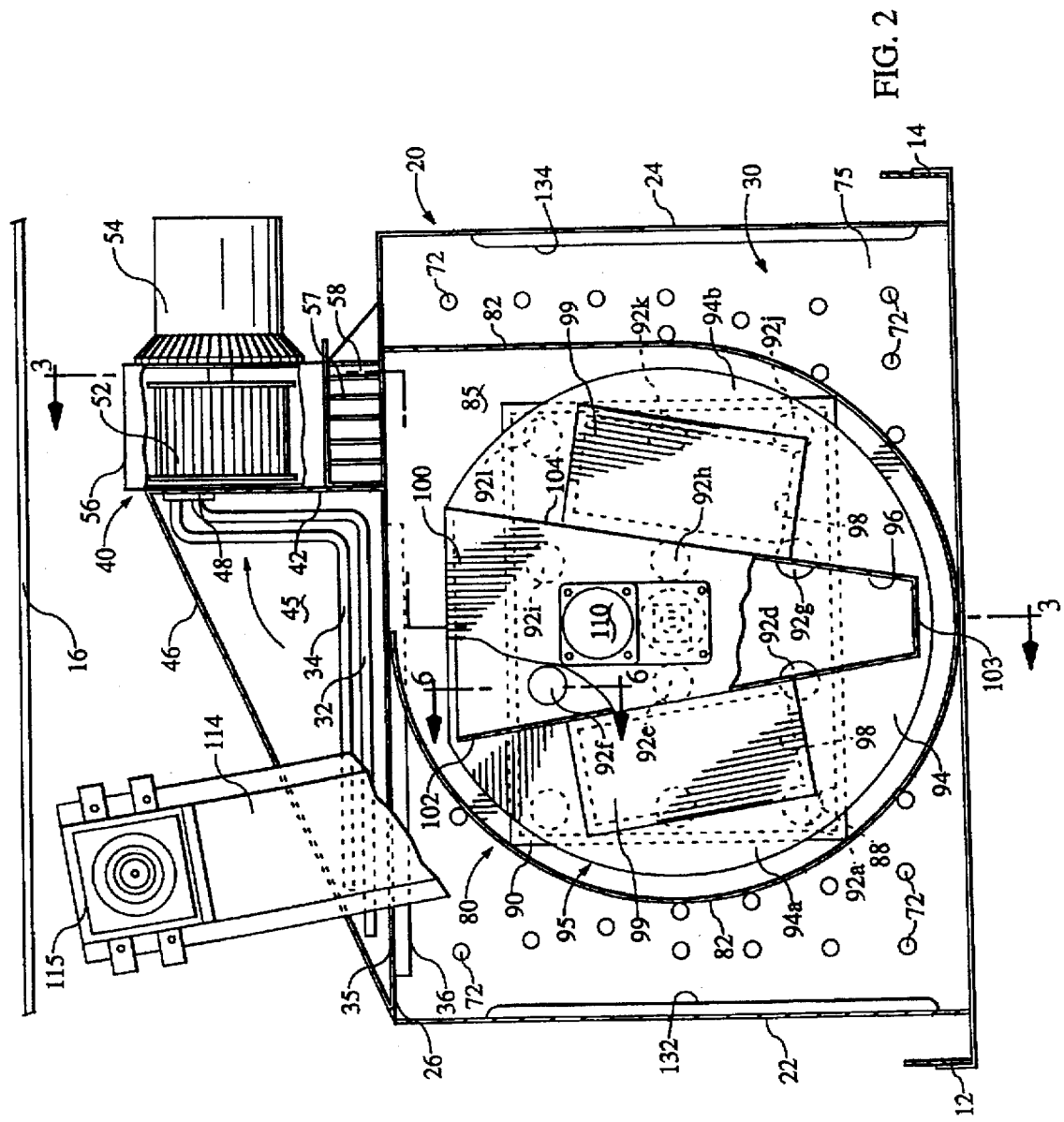
FIG. 2 is a fragmentary top plan view, parts being broken away to more clearly illustrate details of construction.
Figure 3:
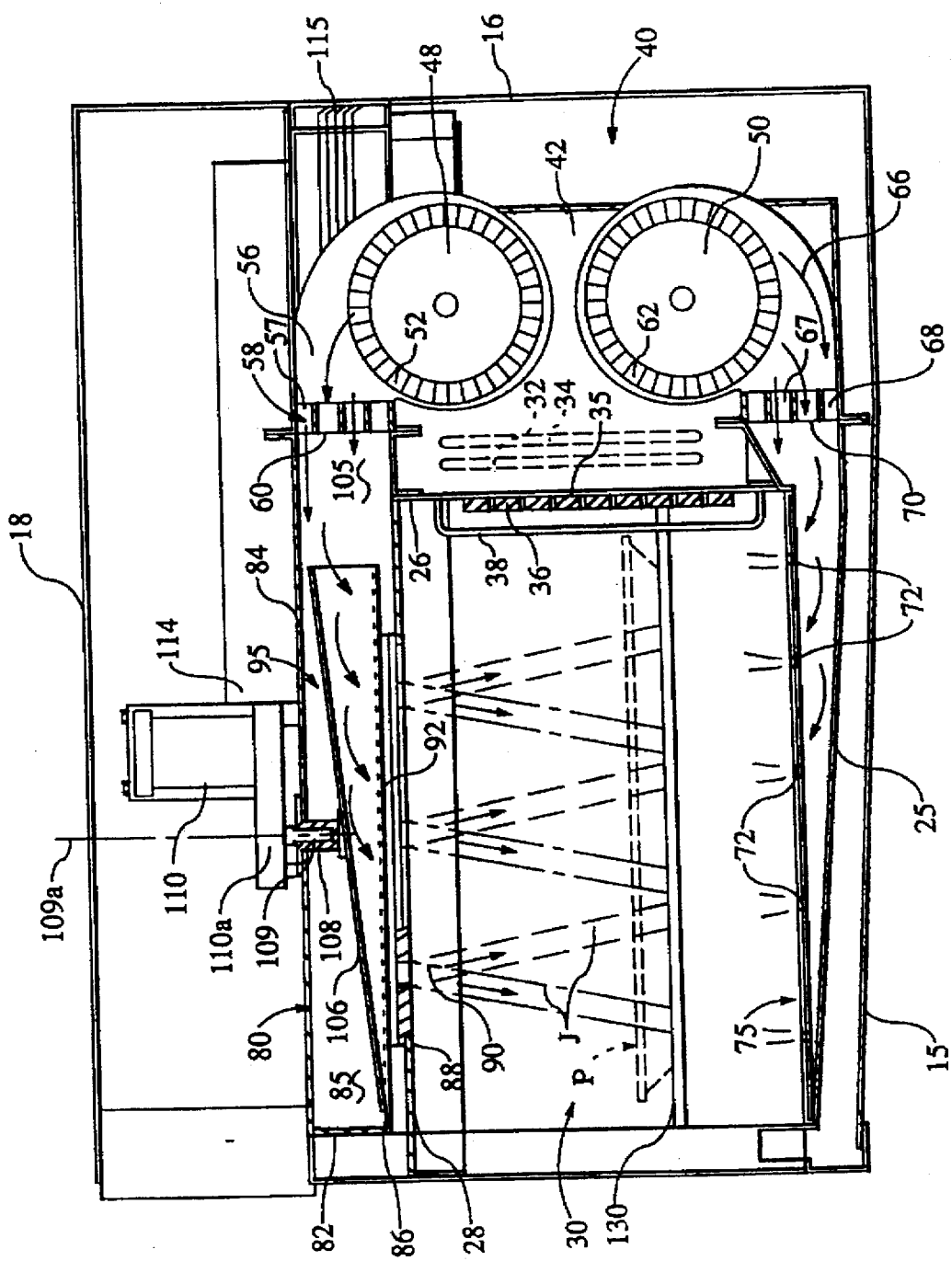
FIG. 3 is a cross-sectional view taken substantially along line 3—3 of FIG. 2.
Figure 4:
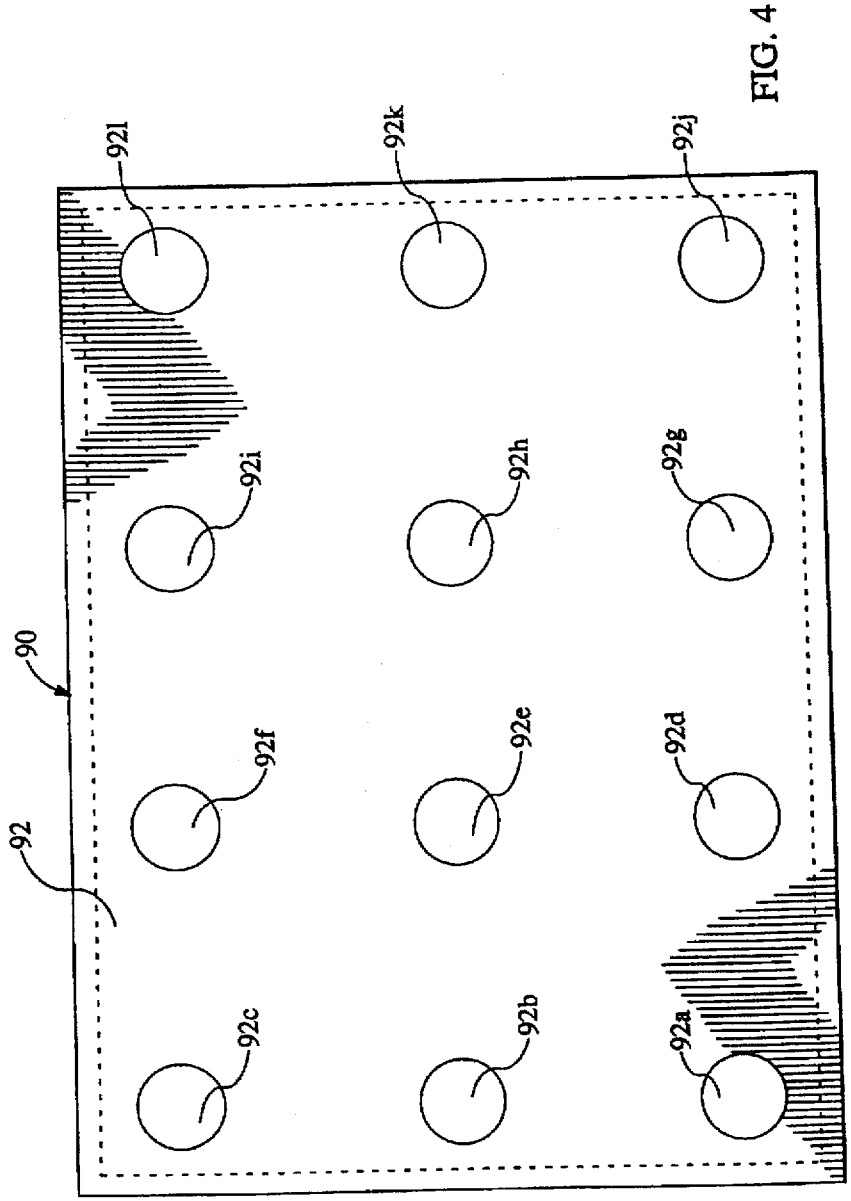
FIG. 4 is a top plan view of a top jet plate.
Figure 5:
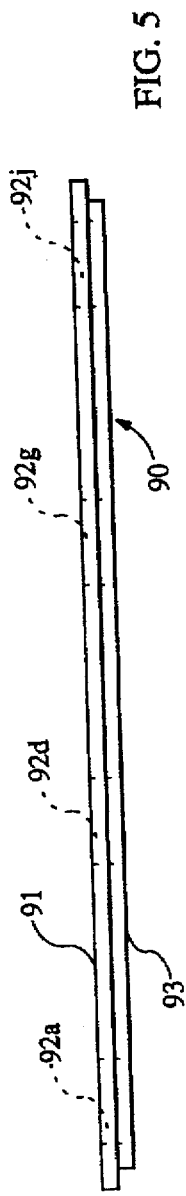
FIG. 5 is a front elevational view of the top jet plate.

As illustrated in FIGS. 1, 2 and 3, a blower assembly, generally designated by the numeral 40, is mounted between the rear wall 16 of case 10 and rear wall 26 of oven cabinet 20. Blower assembly 40 includes a partition wall 42 and a rear baffle secured to rear wall 26 to form a tapered air return duct 45. An air return opening 35 is formed in the rear wall 26 of oven cabinet 20 to provide fluid communication between cooking compartment 30 and the interior of air return duct 45. A perforated plate 36 covers air return opening 35. Perforated plate 36 has a sufficient number of openings extending therethrough to permit substantially unimpeded passage of air from cooking compartment 30 into air return duct 45. Openings in perforated plate 36 are sized to prevent significant passage of microwave energy from cooking compartment 30 into air return duct 45.

As illustrated in FIGS. 2 and 3, heating elements 32 and 34 are mounted between the rear wall 26 of the oven cabinet 20 and baffle 46 for heating air in return duct 45. Heating elements 32 and 34 are preferably electrical heating elements, each being connected to controls for providing continuous control of air temperature. Heating elements 32 and 34 may be used independently or simultaneously for controlling the temperature of air flowing through air return duct 45. It should be appreciated that heating elements 32 and 34 may be used separately or in combination with other heating elements mounted in ducts 58 and 68. Other means for controlling the temperature of air circulated through cooking compartment 30, such as heat lamps, or surfaces coated with susceptor material which will be heated by microwave, may be employed if it is deemed expedient to do so.

A pair of bumpers 38, best illustrated in FIG. 3, are secured to rear wall 26 for preventing contact of pans with rear wall 26. Bumpers 38 are preferably coated with an electrically nonconductive material to prevent arcing between metallic pans and perforated plate 36.

Blower intake openings 48 and 50 are formed in partition wall 42. A blower 52, driven by an electric motor 54 is mounted in a blower housing 56. Blower housing 56 communicates through a top delivery duct 58 for delivering air through top delivery passage 60. A second blower 62, driven by an electric motor 64, is mounted in a housing 66. Housing 66 communicates with bottom delivery duct 68 for delivering air through bottom delivery passage 70.

As best illustrated in FIGS. 2 and 3 of the drawing, air directing grids 57 and 67 are mounted in top delivery duct 58 and bottom delivery duct 68, respectively. Air directing grids 57 and 67 are formed by horizontally and vertically extending partitions jointed to form a plurality of elongated passages which project distinct generally parallel air streams through top and bottom delivery passages 60 and 70. Each passage through each air directing grid 57 and 67 preferably has a length which is greater than or equal to the maximum dimension of any cross-sectional area through the passage. Further, the cross-sectional area of each passage through each grid 57 and 67 is preferably sized and has a length sufficient to block passage of microwaves therethrough.

Air directing grids 57 and 67 form and delivery generally parallel streams of air through the top and bottom delivery passages 60 and 70. The air directing grids 57 and 67 also prevent leakage of microwave energy from the cooking compartment 30 into the blower assembly 40.

A bottom jet plate 75, best illustrated in FIGS. 3 and 9–13, has an upper surface 74 and a lower surface 76. Spaced rows of orifices 72 extend through bottom jet plate 75. A baffle 78 is welded or otherwise secured to lower surface 76 of bottom jet plate 75 and has an end 78a positionable adjacent opposite edges of bottom delivery passage 70 from the lower duct 68 for directing air flow to passages 72 on opposite sides of baffle 78 for equalizing air flow through passages 72.

Figure 11:
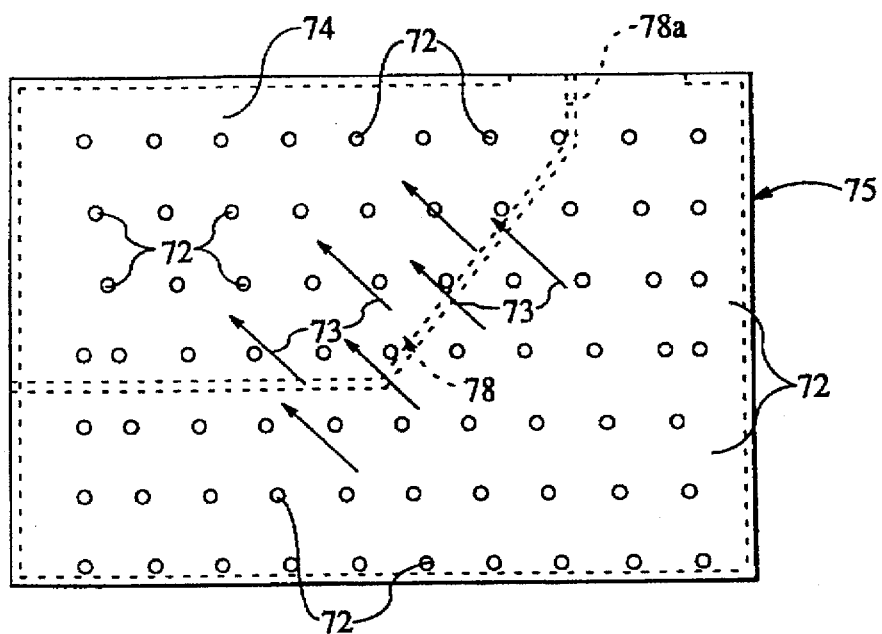
FIG. 11 is a top plan view of the bottom jet plate.
Figure 12:
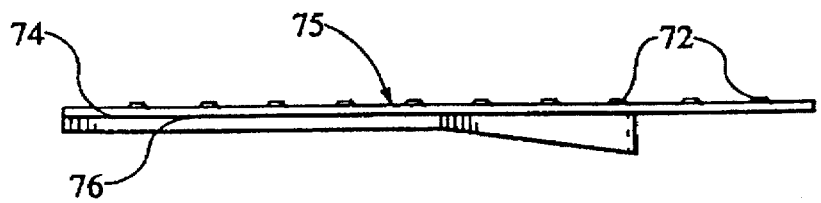
FIG. 12 is a front elevational view of the bottom jet plate.
Figure 13:
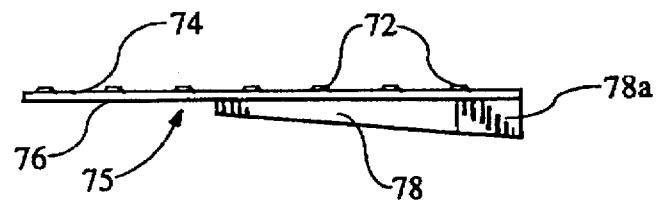
FIG. 13 is a side elevational view of the bottom jet plate.
Figure 15:
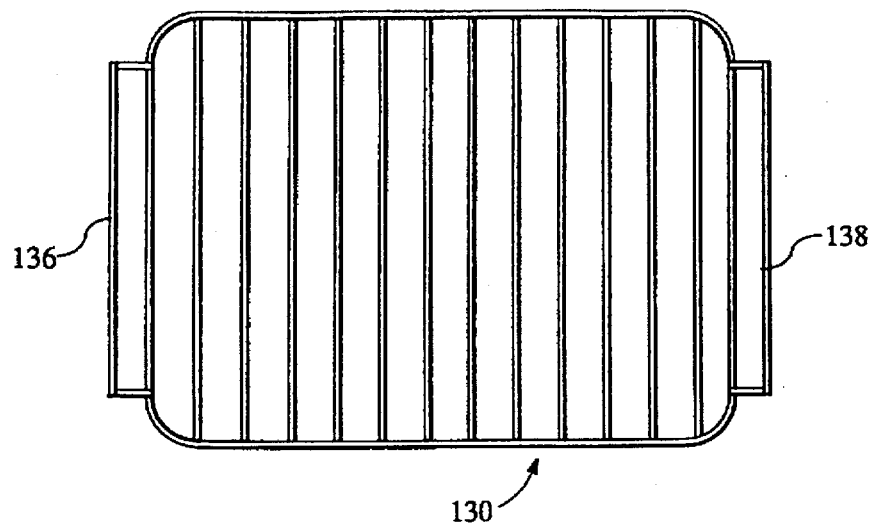
FIG. 15 is a top plan view of the pan rack.
Figure 16:
FIG. 16 is a front elevational view.
Figure 17:
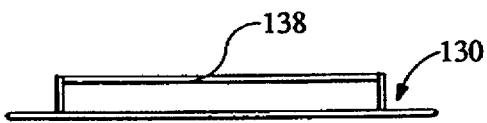
FIG. 17 is an end view of the pan rack.
Figure 14:
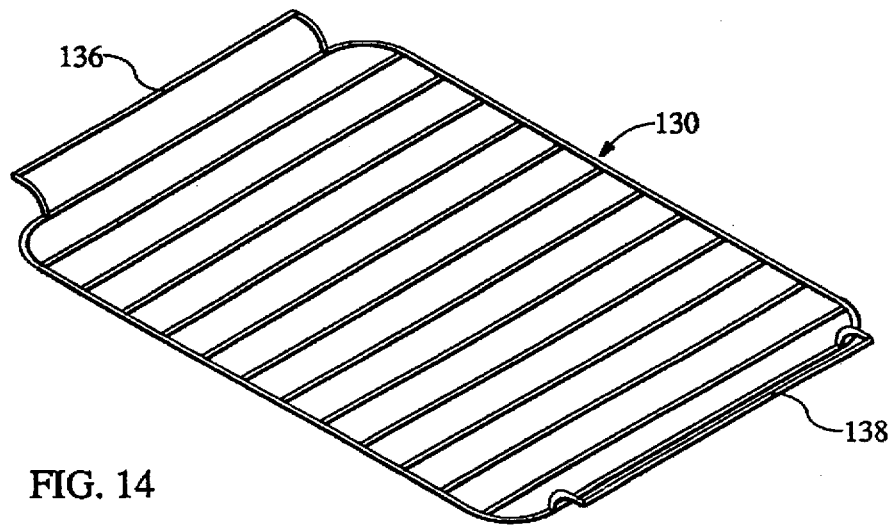
FIG. 14 is a perspective view of a pan rack.

As best illustrated in FIG. 11, orifices 72 are arranged in rows to form an array of air return paths 73 between orifices 72 extending toward air return opening 35 formed in rear wall 26 of oven cabinet 20. Orifices 72 are preferably arranged in a pattern to form air return paths 73 to minimize "washout" of discrete streams of air flowing through orifices 72.

A top jet plate assembly, best illustrated in FIGS. 2–7, is generally designated by the numeral 80. Top jet plate assembly 80 has a generally spiral shaped outer side wall 82, a top wall 84 and bottom wall 86 enclosing a plenum 85. A window 88 is formed in bottom wall 86 and covered by an orifice plate 90 having an array of orifices 92a–92l formed therethrough. In the illustrated embodiment, orifice plate 90 has four rows with three orifices in each row such that the orifices 92a–92l are arranged in rows and columns, the orifices being substantially equally spaced in each row and each column.

Figure 8:
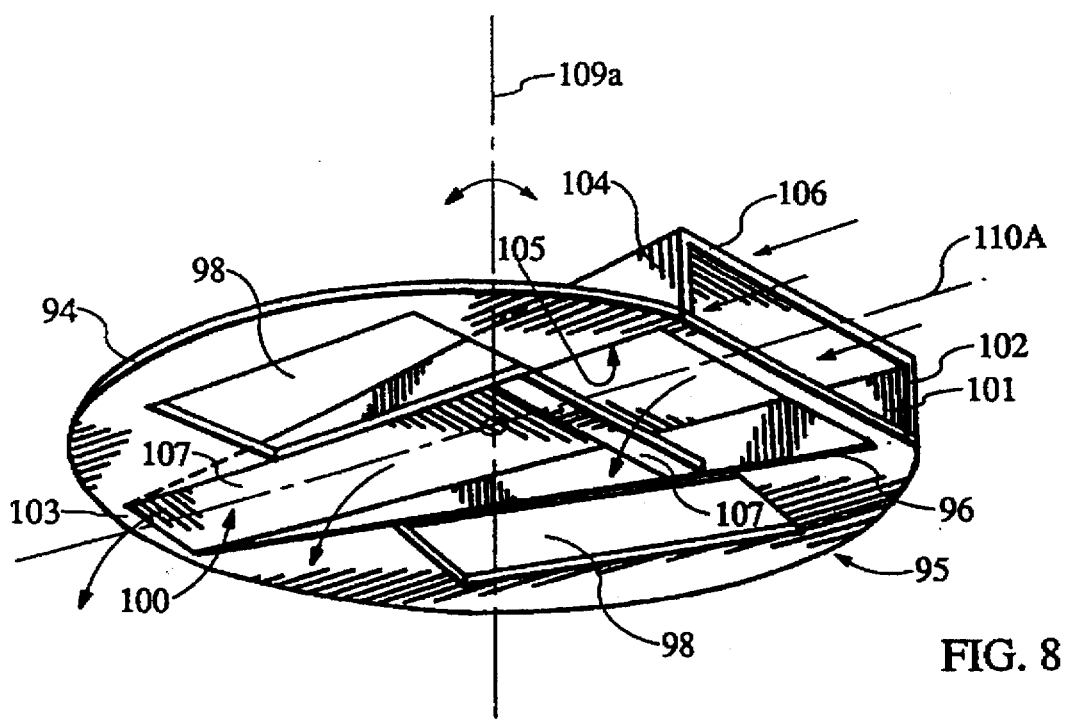
FIG. 8 is a perspective view illustrating the bottom of the stirrer plate.
Figure 9:
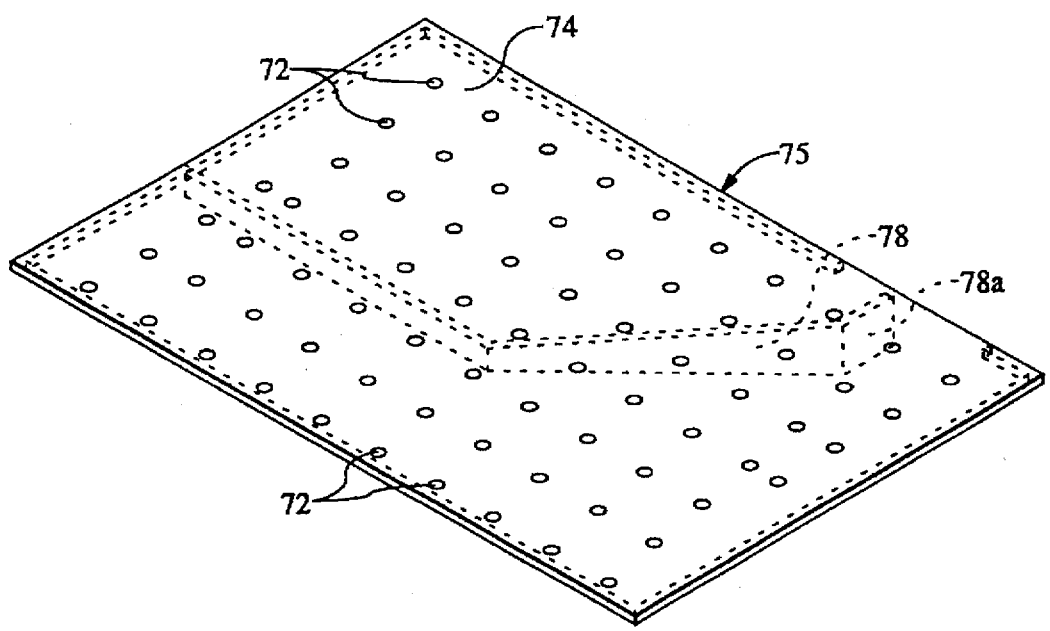
FIG. 9 is a perspective view illustrating the top of a bottom jet plate.
Figure 10:
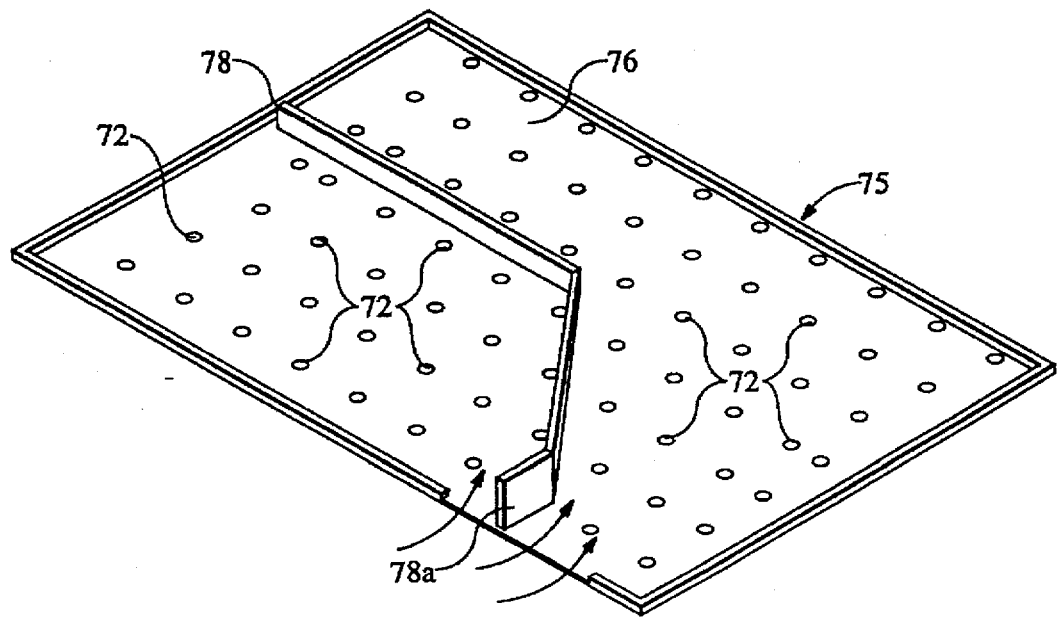
FIG. 10 is a perspective view illustrating the bottom of the bottom jet plate.

A stirrer, generally designated by the numeral 95 and best illustrated in FIGS. 2, 3 and 8, is formed by a generally flat disc element 94 having a central, generally wedge shaped cutout portion 96 and a plurality of generally rectangular cutout portions 98 adjacent opposite sides of cutout portion 96. As will be hereinafter more fully explained, cutout portion 96 forms an outlet through which air is delivered to orifices 92-a–92l while microwave energy is delivered through spaced cutouts 98.

An upper air supply duct 100 is formed by side walls 102 and 104 and an upper wall 106. Side walls 102 and 104 are inclined and have lower edges welded or otherwise secured adjacent edges of the central cutout portion 96 of disc 94. An end wall 103 extends between side walls 102 and 104 and has a lower edge welded or otherwise secured to disc 94 adjacent the narrow end of tapered cutout portion 96 and an upper edge welded or otherwise secured to the upper wall 106 of duct 100.

When viewed in a vertical plane, upper and lower edges of side walls 102 and 104 are inclined downwardly toward end wall 103 such that top wall 106 slopes downwardly toward end wall 103. An air passage 105, between side walls 102 and 104 and between top wall 106 and jet plate 92, is tapered. Duct 100 can be said to have a double taper since the cross-sectional area of air passage 105 decreases when viewed in both horizontal and vertical planes toward end wall 103. Plates 99, constructed of microwave transparent material, cover cutout portions 98 formed in the wing portions 94a and 94b of disc 94 adjacent opposite sides of duct 100. Referring to FIG. 2 it should be readily apparent that the wing portions 94a and 94b and plates 99 completely block the flow of air through orifices 92a, 92b, 92c, 92j, 92k and 92l when duct 100 is in the position illustrated in FIG. 2. Orifices 92d and 92g are partially blocked while orifices 92e, 92f, 92h and 92i are uncovered and communicate with the air passage 105 in duct 100.

A drive coupling 108 is secured to the upper surface of the upper wall 106 of duct 100. A driven shaft 109 imparts rotation to stirrer 95 and duct 100 through drive coupling 108. Drive shaft 109 may be driven by any suitable drive mechanism including pulleys and belt, a chain and sprockets, or a direct drive motor. In the illustrated embodiment, drive shaft 109 is driven through a gear box 110a by an electric motor 110. Motor 110 and gear box 110a are preferably selected to permit rotation of stirrer 95 at a speed in a range between about four revolutions per minute and about 60 revolutions per minute. It has been found that when stirrer 95 and duct 100 rotate in a speed range between about 4 and 20 revolutions per minute best results are generally achieved.

Top wall 18 preferably has an opening through which the drive shaft 109 extends to drivingly engage drive coupling 108. Motor 110 and gear box 110a are preferably mounted on the upper surface of the top wall 18 of oven cabinet 20. Further, the top wall 18 of oven case 10 preferably has an opening 112 formed therein through which microwave energy is delivered through a wave guide 114 from a magnetron 115.

The temperature of fluid flowing through return duct 45 is controlled by an adjustable thermostat connected to heating elements 32 and 34 in the return duct. Motor 110 rotates duct 100 for establishing an array of paths from the blower 52 toward each orifice 92a–92l such that a stream of fluid is formed as fluid flows through each orifice 92. When temperature controlled fluid is delivered along each path of the array of paths, the direction of each stream of fluid flowing from each orifice changes, as diagrammatically illustrated in FIGS. 6 and 7, in response to changes in the direction of the flow of fluid toward the orifice. Heat is transferred between the surface of the product and the stream of fluid impinging against the surface of the product.

Air in the plenum chamber 85 flows through rotating duct 100 along an array of paths toward outlet orifice 92 such that an air stream or jet J is formed. As the duct 100 rotates, the direction of the path relative to the outlet orifice 92 is constantly changing which changes the direction of the stream or jet J of fluid from the outlet orifice 92.

It should be apparent that controlling the direction of fluid flow toward each orifice 92 controls the direction of fluid flowing out of the orifice 92 toward the surface of the product. Changing the direction of fluid flow toward the orifice 92 changes the direction of fluid flowing from the orifice toward the surface of the product.

Fluid is directed through duct 100, having a longitudinal duct axis 100A, toward the duct outlet 107. When the axis 100A of the duct 100 moves relative to the orifice axis 92A, the lower end 91A' of the jet axis 91A moves relative to the orifice axis 92A.

As hereinbefore described, the oven case 10 has side walls 12 and 14, a top wall 15, bottom wall 18 and a rear wall 16. The oven case 10 extends around the oven cabinet 20 having side walls 22 and 24, top wall 25, bottom wall 28 and a rear wall 26. The cooking compartment, inside the oven cabinet 20 has a lower air dispenser 75 and an upper air dispenser 80.

The baffle 46, connected between the rear wall 26 of the cabinet 20 and the rear wall 16 of the case 10 forms a single tapered air return duct 45 bounded on one side by the partition wall 42 extending between the baffle 46 and the rear wall 26 of the cabinet 20. It is important to note that the partition wall 42 preferably has at least two blower intake openings 48 and 50, as illustrated in FIG. 3.

It should be readily apparent that in view of the position of rear baffle 46 extending generally diagonally across the rear corner of the interior of oven case 10, a substantial volume of space is provided for mounting relays and controllers for operating blower motors 54 and 64, stirrer motor 110 and a cooling fan motor for magnetron 115.

First and second blowers 52 and 62 are mounted for drawing air from the cooking compartment 30 through the air return duct 45 and for dispensing air through the upper and lower air dispensers 80 and 75 into the cooking compartment 30. Independent control means 54a and 64a, best illustrated in FIG. 1, such as rheostats or other motor controllers, are preferably provided for controlling the speed of the first and second blowers 52 and 62 for independently controlling the volume of air delivered by each blower into the cooking compartment 30. Each blower 52 and 62, in a preferred embodiment, is sized to deliver at least about 100 cubic feet per minute of air into the cooking compartment 30 and the upper and lower air dispensers 80 and 75 are adapted to deliver air at a jet velocity in a range between about 1500 and about 2500 feet per minute into the cooking compartment 30.

As will be hereinafter more fully explained, a pan rack 130 is preferably supported by any suitable adjustable mounting means 133 in the cooking compartment 30. In the illustrated embodiment, the rack supports 132 and 134 are mounted on the side walls 22 and 24 of the cabinet 20 for adjusting the position of the pan rack 130 relative to air dispensing apparatus 75 and 80.

As will be hereinafter more fully explained, the bottom air dispenser includes jet plate 75 having a plurality of orifices 72 arranged in spaced rows for forming an array of air return paths 73 to permit substantially unobstructed flow of spent air toward the air return passage 35, covered by an air filter 36.

The upper air dispenser 80 includes a jet plate 90 having spaced orifices 92 to which temperature controlled air is delivered through a duct 100 having a longitudinal axis 100A and an outlet passage 105. The driven shaft 109 rotates the duct 100 about a generally vertical axis 109a, as diagrammatically illustrated in FIGS. 3 and 8, for sequentially delivering air through a portion of the orifices 92a–92l formed in the top jet plate 90, best illustrated in FIGS. 1, 6 and 7, while preventing flow of air through another portion of the orifices.

The opening into the front of cooking chamber 30 is closed by a door assembly 120 mounted on suitable hinges (not shown) to close the space between side walls 22 and 24 of the oven cabinet and between the bottom and top walls 25 and 28. Hinges are preferably mounted on the bottom wall 15 of the oven cabinet. However, it should be readily apparent that hinges may be mounted on side walls 22 or 24, if it is deemed expedient to do so. Door 120 is preferably provided with a window 122 to permit viewing food products in cooking compartment 30 and is provided with a latch 124 for maintaining the door in a closed position.

Controls for the components of the oven are preferably mounted on a control panel C adjacent the door assembly 120. In the illustrated embodiment, a microwave power controller M, a programmable temperature controller T, a cook time controller H, start switch S and a power switch O are mounted on control panel C. In addition, upper and lower blower controllers 54a and 65a are mounted on control panel C.

Food products cooked in residential ovens are usually placed in a pan that may be made of material that is a good heat conductor.

A pan rack 130 is adjustably mounted between rack supports 132 and 134 mounted on side walls 22 and 24 of the oven cabinet 20. Each rack support 132 and 134 has a plurality of connectors such as vertically spaced grooves 133a, 133b and 133c to permit vertical adjustment of rack 130 relative to the bottom jet plate 75. The rack 130 preferably has rails 136 and 138 extending along opposite edges thereof which are received in grooves 133a–133c, to permit adjustment of the distance between the lower surface of a pan P, shown in dashed outline in FIG. 3, supported on pan rack 130 and bottom jet plate 75.

In this configuration the jets impinge upon the lower surface of the pan before air forming the jets is diffused forming hot spots on the bottom of the pan. Heat is rapidly conducted by a metallic pan away from each hot spot such that the temperature of the upper surface of the bottom of the pan is relatively uniform in view of the spacing of orifices 72.

When rack 130 is mounted in the upper groove 133a, the bottom of the pan is spaced a sufficient distance from jet plate 75 to permit the discrete streams of temperature controlled air flowing through orifices 72 to dissipate or diffuse. In this position the rate of heat transfer to the bottom of the pan is significantly reduced.

The heat transfer rate to the bottom of the pan may also be adjusted by adjusting the speed of motor 64 driving blower 62 that delivers air into the tapered duct below the lower jet plate 75. A reduction in the volume of air delivered through orifices 72 in bottom jet plate 75 will reduce the rate that heat is transferred to the bottom of the pan.

If the food container supported on rack 130 is not a good heat conductor, the speed of the blower motor 64 may be reduced or motor 64 may be turned off, depending upon the food product that is to be cooked.

If pan P has a bottom that is a good thermal conductor, the bottom of the pan is preferably positioned sufficiently close to the upper surface 74 of jet plate 75 to form "hot spots" on the bottom of the pan where the jets impinge. However, heat is rapidly conducted laterally through the bottom of the pan such that heat is substantially uniformly applied to the bottom surface of the product that engages the upper surface of the bottom of the pan.

If the bottom of pan P is not a good thermal conductor, the volume of air delivered by blower 62 may be reduced or pan rack 130 may be elevated to prevent forming "hot spots" which may result in over browning portions of the bottom surface of the food product engaging the upper surface of the bottom of pan P.

It should be appreciated that jet plate 75 may be moved or replaced with a jet plate assembly similar to that designated by the numeral 80 and hereinbefore described, for causing jets to sweep across the lower surface of pan P.

In certain instances, food items such as a slice of bread may be supported directly on the rack 130.

Air drawn through the upper air intake opening 48 by the upper blower 52 is delivered through top delivery duct 58. Air delivered through top delivery duct 58 moves through top delivery passage 60 into the upper plenum 85 and ultimately through the inlet passage 101 into the air passage 105 in duct 100.

Duct 100 has a longitudinal axis 100A extending longitudinally. Air delivered through inlet passage 101 flows in a direction generally parallel to axis 100A toward the end wall 103. A bridge 107 has opposite ends welded or otherwise secured adjacent opposite edges of cutout portion 96. Bridge 107 rotates with duct 100, to periodically block the flow of fluid through orifices 91a–92l.

Figure 6:
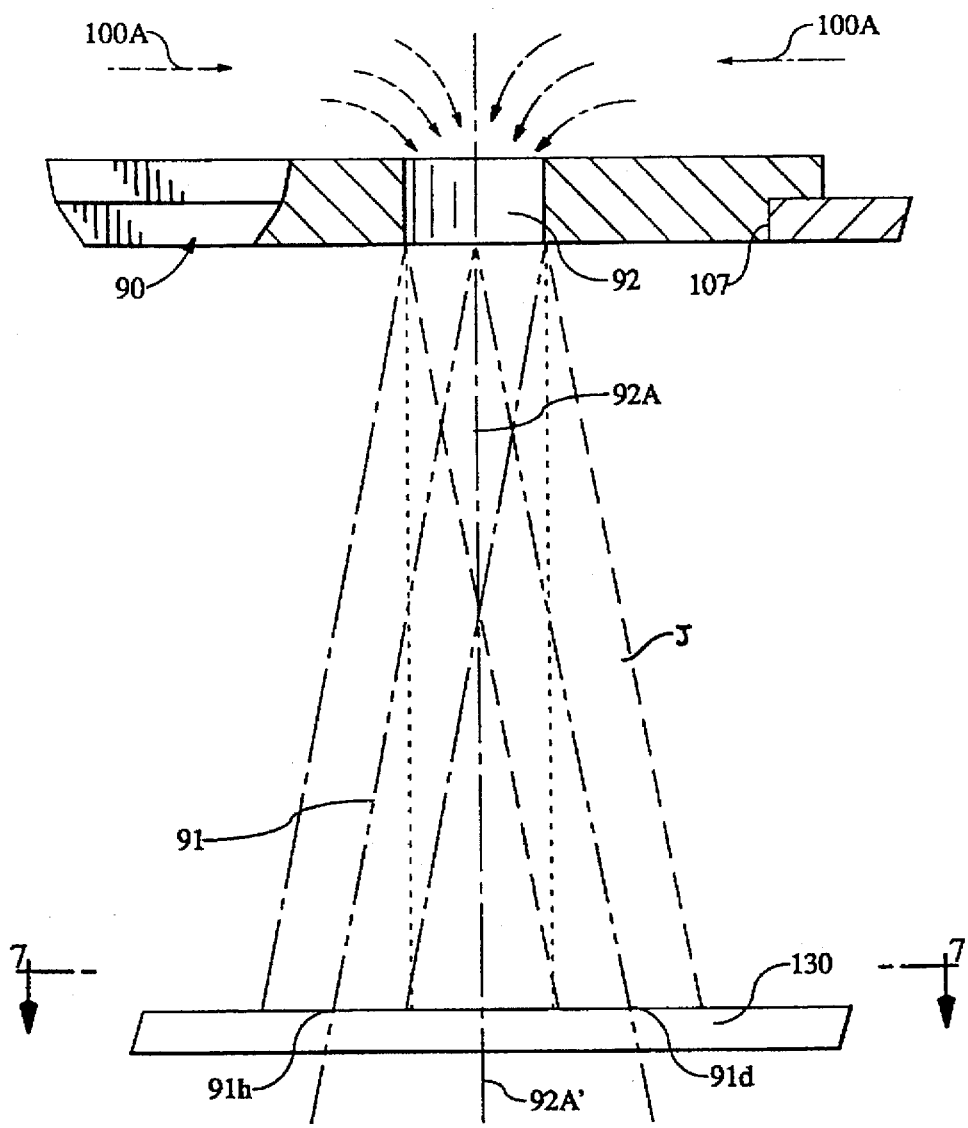
FIG. 6 is an enlarged diagrammatic cross-sectional view taken substantially along line 6—6 of FIG. 2.
Figure 7:
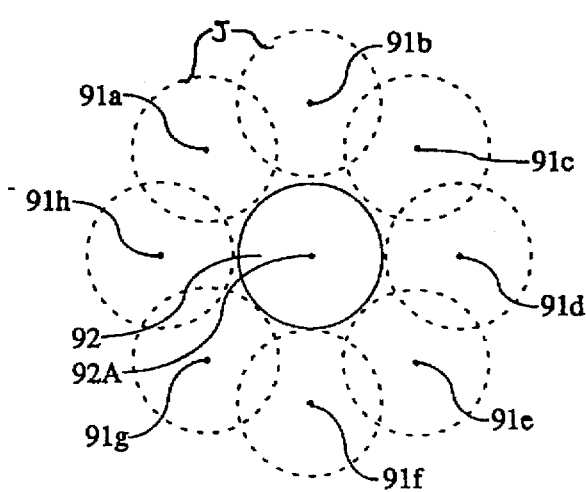
FIG. 7 is a schematic diagram looking in the direction of arrows along line 7—7 of FIG. 6.

The air in air passage 105 flows downwardly through the orifices 92a–92l that are positioned between side walls 102 and 104 of duct 100 as it rotates about the axis of coupler 108. As best illustrated in FIG. 6 each orifice 92 has a central axis 92A extending generally vertically downwardly. However, air flowing through each orifice 92 is inclined relative to the axis 92A and the lower end of each air stream oscillates about the axis 92A as duct 100 rotates. Thus, the point of impingement of each jet J formed by fluid flowing through orifices 92 will move or sweep across a surface positioned below jet plate 92.

Duct 100 preferably has a relatively short height, for example approximately two inches to minimize the space required for forming the jets that sweep across the surface of a food product supported on rack 130.

Since the upper air streams move across the surface of a food product supported on rack 130, movement of the food product, for example on a turntable, generally is not necessary. However, if it is deemed expedient to do so, a turntable may be mounted on rack 130 or supported directly on the lower jet plate 75 for moving a food product in cooking compartment 30.

Orifices formed in the bottom jet plate 75 and the top jet plate 90 are sized and positioned to form and deliver upper and lower streams of air toward a food product supported on rack 130. After the air streams impinge upon the surface of a food product supported on rack 130, spent air is drawn through air return opening 35 formed in the rear wall 26 of the oven cabinet 20 into the tapered air return duct 45.

Depending upon the particular food product being cooked in the oven, one or both of the blower motors 54 and 64 may be energized for delivering air jets to impinge upon either the upper or lower surface of the food product or upon both surfaces as desired. It should be readily apparent that air may be delivered to impinge upon surfaces of the food product with or without using microwave energy. If it is deemed expedient to do so a single blower may deliver air into a plenum and dampers may be used to control the proportion of air delivered to upper and lower air dispensers.

If the magnetron 115 is turned "on" microwave energy is delivered into the space between the top wall 18 of the oven case and the top wall 28 of the oven cabinet through wave guide 114.

As the stirrer 95 rotates, microwave energy is delivered through the microwave transparent cover plates 99, covering openings 98 formed in wings 94a and 94b on disc 94. The irregular shape of surfaces forming duct 100 and the rotating disc 94 will stir and constantly change the direction at which microwave energy is delivered into the cooking compartment 30. Thus, hot spots in the cooking chamber 30 will be stirred constantly to prevent overheating of localized areas on a food product. Further, if blower motors 54 and 64 are turned "on" air impinging against the surface of the food product will tend to reduce the temperature of overheated portions on the surface of the food product while transferring heat to cooler portions of the surface of the food product for drying, browning and crisping the surface of the food product.

When microwave energy is used for cooking, moisture in the product tends to migrate toward the surface. It is this moisture migrating toward the surface that often leaves food cooked by microwave soggy. The jets of air impinging upon the surface of the food product create areas of intense heat transfer, evaporating moisture from the surface of the food product and wiping away a boundary layer of air which ordinarily tends to insulate the food product and reduce surface heating of the product.

It should be noted that the terms "up" and "down," "front" and "rear," "top" and "bottom" and "above" and "below," are used merely to facilitate the description of the illustrated embodiment of the invention and that these terms are not intended to limit the scope of the invention. The terms "orifice" and "orifices" are intended to include circular or non-circular openings, passages, ports, vents, apertures or holes configured to form and project a stream of fluid, including slots or hollow tubes. "Heating" is intended to mean the transfer of heat to or from a product and includes cooling.

From the foregoing it should be readily apparent that the structure of the oven hereinbefore described permits the use of both microwave and jet impingement heating or either one of them separately in an oven that is susceptible to being installed in residential kitchens. However, it should be appreciated that the oven hereinbefore described has broader utility and may be used as a countertop oven for either residential or commercial purposes. The oven is particularly suited for rapidly heating refrigerated food products served in cafeterias, restaurants and convenience stores.

What is claimed is:

1. A method for transferring heat between a stream of fluid impinging the surface of a product and a product comprising:
   a) controlling the temperature of a volume of fluid;
   b) establishing an array of paths from said volume of fluid toward a stationary orifice such that a stream of fluid is formed as fluid flows through the orifice; and
   c) delivering temperature controlled fluid along each path of said array of paths such that the direction of the stream of fluid flowing out from the orifice changes in response to changes in the direction of the flow of fluid toward the orifice such that heat is transferred between the surface of the product and the stream of fluid impinging the surface of the product.

2. A method for controlling heat transfer between fluid flowing through orifice forming a jet that impinges against the surface of a product comprising the steps of:
   positioning a member having a stationary orifice in a predetermined location relative to the surface of a product, said orifice having an orifice axis extending generally toward the surface of the product;
   controlling the direction of fluid flow toward said orifice for controlling the direction of fluid flowing out of said orifice toward the surface of the product; and
   changing the direction of fluid flow toward said orifice for changing the direction of fluid flowing from said orifice toward the surface of the product.

3. A method according to claim 2, the step of controlling the direction of fluid flow toward the orifice comprising:
   delivering fluid through a duct having an axis, said duct having an outlet; and
   moving the axis of said duct relative to said orifice for moving said outlet relative to said orifice.

4. A method of sweeping a stream of fluid across a surface comprising:
   a) delivering temperature controlled fluid into a chamber, said chamber having a stationary outlet orifice;
   b) directing fluid in said chamber along a path toward said outlet orifice such that a fluid stream is formed; and
   c) changing the direction of fluid along said path in relative to said outlet orifice or changing the direction of said fluid stream from said outlet orifice.

5. A method according to claim 4, the step of directing fluid in said chamber along a path toward said outlet orifice comprising:
   a) delivering fluid in said chamber into a duct having a longitudinal axis; and
   b) moving said duct relative to said stationary outlet orifice for changing the direction of the flow of fluid toward said outlet orifice.

6. A method according to claim 4, wherein said chamber has a plurality of outlet orifices arranged such that changing the direction of said path causes temperature controlled fluid to be delivered sequentially through individual orifices of said plurality of outlet orifices.

7. Apparatus to transfer heat to the surface of a product comprising:
   a product support;
   a duct having a duct entrance, a duct outlet and a longitudinal duct axis;
   a plenum for delivering temperature controlled fluid into said entrance of said duct such that fluid flows longitudinally of said duct toward said outlet;
   a perforated jet plate spaced from said product support, said plate having at least one orifice, said orifice having an orifice axis extending generally toward said product support for forming a jet of fluid, having a jet axis, flowing in a predetermined direction; and
   drive means for moving said duct along said longitudinal duct axis in relative to said orifice axis for changing the direction of the jet of fluid along said jet axis in relative to said orifice axis thereby moving said jet axis relative to the product support.

8. Apparatus to transfer heat to a product surface according to claim 7, wherein the heat transfer rate between the jet of fluid and the surface of the product is intense where the jet impinges against the surface of the product, and wherein said drive means for moving said longitudinal duct axis causes said jet to move relative to said orifice axis to substantially uniformly heat the product surface over an area that is significantly greater than the cross-sectional area of said jet of fluid.

9. Apparatus to transfer heat according to claim 7, said duct having a generally U-shaped configuration with an open side adjacent said perforated jet plate.

10. Apparatus to transfer heat according to claim 7, wherein said perforated jet plate has a plurality of orifices arranged in an array of orifices;
   said duct having an elongated air passage and laterally extending wings having surfaces;
   means for positioning said duct such that surfaces on said wings are positioned adjacent said surface on said perforated jet plate; and
   whereby said drive means moves said longitudinal duct axis such that said wings obstruct air flow to a portion of said array of orifices and move said duct outlet into communication with another portion of said array of orifices.

11. Apparatus to transfer heat to a product surface according to claim 7, wherein said jet plate is stationary.

12. A method according to claim 1, wherein said product remains stationary during a cooking cycle.

13. A method according to claim 2, wherein said product remains stationary during a cooking cycle.

14. A method according to claim 4, wherein said product remains stationary during a cooking cycle.

15. An apparatus according to claim 7, wherein said product support means is stationary.

* * * * *